US009110837B2

United States Patent
Patel et al.

(10) Patent No.: US 9,110,837 B2
(45) Date of Patent: Aug. 18, 2015

(54) SYSTEM AND METHOD FOR CREATING AND MAINTAINING SECONDARY SERVER SITES

(75) Inventors: Burzin Patel, Foster City, CA (US); Steve Wolfe, Katy, TX (US)

(73) Assignee: STORSIMPLE, INC., Santa Clara, CA (US)

( * ) Notice: Subject to any disclaimer, the term of this patent is extended or adjusted under 35 U.S.C. 154(b) by 0 days.

(21) Appl. No.: 12/930,436

(22) Filed: Jan. 4, 2011

(65) Prior Publication Data

US 2012/0173919 A1 Jul. 5, 2012

Related U.S. Application Data

(60) Provisional application No. 61/335,653, filed on Jan. 6, 2010.

(51) Int. Cl.
G06F 12/12 (2006.01)
G06F 11/14 (2006.01)
G06F 12/08 (2006.01)
G06F 3/06 (2006.01)

(52) U.S. Cl.
CPC .............. *G06F 12/122* (2013.01); *G06F 3/065* (2013.01); *G06F 3/067* (2013.01); *G06F 3/0608* (2013.01); *G06F 3/0641* (2013.01); *G06F 11/1448* (2013.01); *G06F 11/1453* (2013.01); *G06F 11/1456* (2013.01); *G06F 11/1464* (2013.01); *G06F 12/0808* (2013.01); *G06F 2201/84* (2013.01)

(58) Field of Classification Search
CPC ............ G06F 11/2028; G06F 11/2038; G06F 11/2023; G06F 11/2097
USPC ........................................................ 714/4.11
See application file for complete search history.

(56) References Cited

U.S. PATENT DOCUMENTS

| | | |
|---|---|---|
| 6,671,780 B1 | 12/2003 | Lu et al. |
| 7,293,133 B1 | 11/2007 | Colgrove et al. |
| 7,567,188 B1 | 7/2009 | Anglin et al. |
| 7,831,793 B2 | 11/2010 | Chakravarty et al. |
| 8,001,352 B1 | 8/2011 | Chatterjee et al. |
| 8,443,157 B1 | 5/2013 | Reiner |
| 8,677,052 B2 | 3/2014 | Patterson |

(Continued)

OTHER PUBLICATIONS

"Non-Final Office Action Received for U.S. Appl. No. 12/930,502", Mailed Date: Sep. 18, 2014, 12 Pages.

(Continued)

*Primary Examiner* — Jigar Patel
(74) *Attorney, Agent, or Firm* — Henry Gabryjelski; Kate Drakos; Micky Minhas

(57) ABSTRACT

Disaster Recovery (DR) and High-Availability (HA) are a critical features required by many information technology systems. DR and HA may be accomplished with a remote secondary site that is kept synchronized with a primary site. To reduce the cost of maintaining a secondary site, the data may be split into two subsets wherein only a first subset of data is kept synchronized at the secondary site using a small bandwidth communication link. The second set of data, which is generally much larger, is periodically backed up at a network accessible back-up location. When a disaster occurs, the secondary site may access the most recent back-up of the second set of data. In a maintenance or limited failure situation, the secondary site can directly access the second data set at the primary site.

20 Claims, 14 Drawing Sheets

(56) References Cited

U.S. PATENT DOCUMENTS

| | | |
|---|---|---|
| 2004/0153606 A1 | 8/2004 | Schott |
| 2005/0125557 A1* | 6/2005 | Vasudevan et al. ............ 709/239 |
| 2006/0010169 A1 | 1/2006 | Kitamura |
| 2007/0168405 A1* | 7/2007 | Pomerantz .................... 707/205 |
| 2008/0201415 A1* | 8/2008 | Herley .......................... 709/203 |
| 2008/0228834 A1* | 9/2008 | Burchall et al. .............. 707/202 |
| 2008/0244172 A1* | 10/2008 | Kano ............................. 711/112 |
| 2010/0257399 A1* | 10/2010 | Brown et al. ..................... 714/4 |
| 2010/0281355 A1* | 11/2010 | White et al. ................... 715/222 |
| 2010/0332452 A1 | 12/2010 | Hsu et al. |
| 2011/0010514 A1 | 1/2011 | Benhase et al. |

OTHER PUBLICATIONS

USPTO, "Final Office Action Issued in U.S. Appl. No. 12/930,502", Mailed Date: Feb. 4, 2015, 12 Pages.

USPTO, "Non Final Office Action Issued in U.S. Appl. No. 13/610,567", Mailed Date: Feb. 5, 2015, 16 Pages.

* cited by examiner

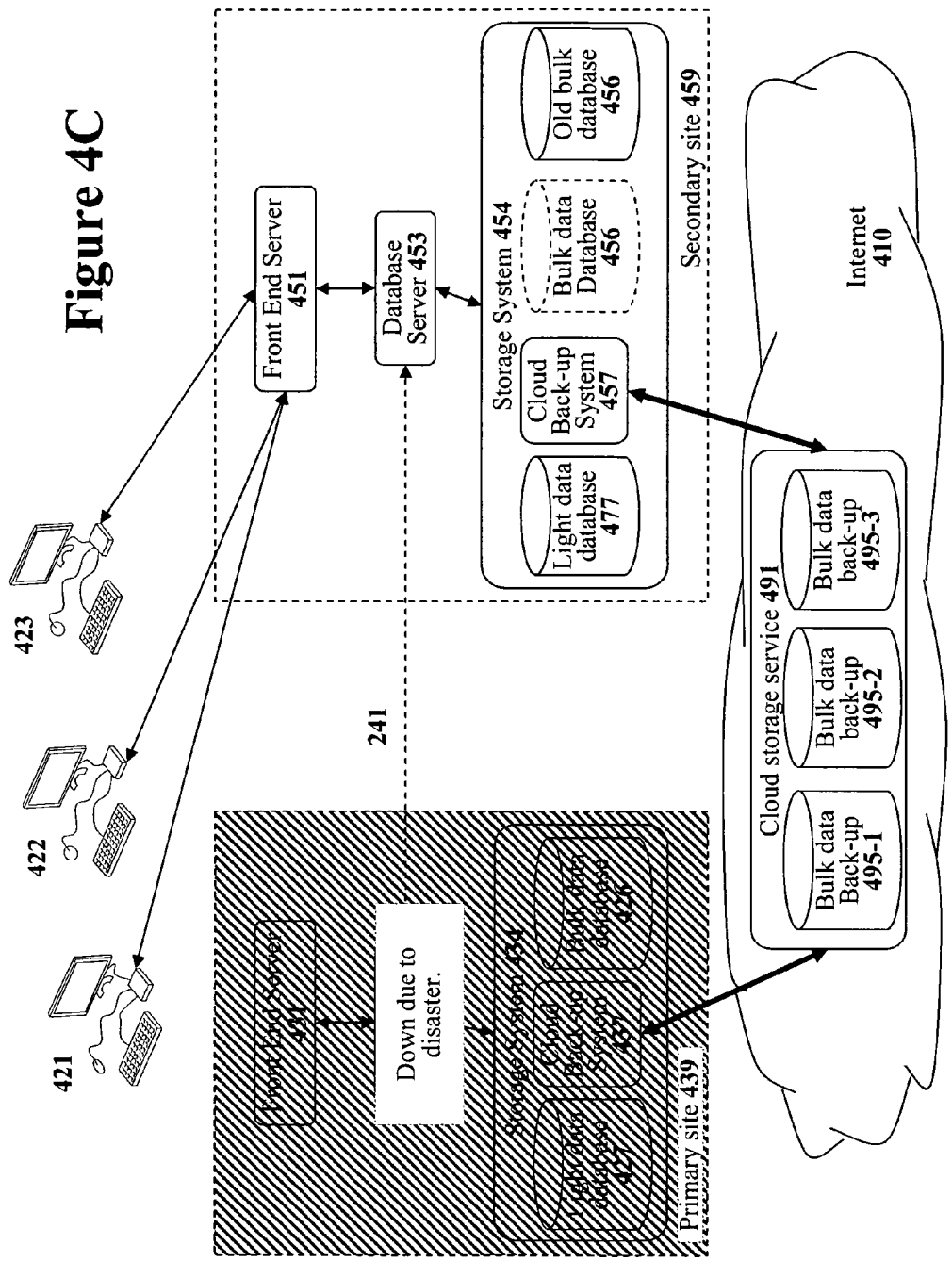

SYSTEM AND METHOD FOR CREATING AND MAINTAINING SECONDARY SERVER SITES

RELATED APPLICATIONS

The present patent application claims the benefit of the previous U.S. Provisional Patent Application entitled "SYSTEM AND METHOD FOR STORING DATA OFF SITE" filed on Jan. 6, 2010 having Ser. No. 61/335,653.

TECHNICAL FIELD

The present invention relates to the field of digital computer systems. In particular, but not by way of limitation, the present disclosure teaches techniques for creating and maintaining secondary server sites that may be used for a variety of purposes.

BACKGROUND

Computer systems have become an indispensable tool used in modern life. Nearly every business and government agency is now dependent upon computer systems for digital communication, project planning, document creation, information storage, transaction processing, inventory management, financial operations, and a large number of other mission critical services.

Although individual pieces of computer hardware and computer software can easily be replaced by an entity using computer systems by purchasing new computer equipment or computer software, the entity's accumulated stores of data cannot easily be replaced. The accumulated store of data is critical for allowing a business and government agency to continue operating. Thus, maintaining access to the accumulated data and protecting that accumulated data is one of the most critical parts of any modern information technology infrastructure for a business, government agency, or any other entity.

Two important features in providing data storage within an information technology infrastructure are high-availability (HA) data services and disaster recovery (DR) services. High-availability encompasses the task of ensuring that the stored data is available almost all of the time. Thus, even when system maintenance is being performed or when there are minor hardware, software, or network problems, a high availability data storage system will continue to provide access to stored data. Disaster recovery refers to the ability to restore a data storage system even when a major disaster strikes an information technology site such as a data center burning down.

An ideal data storage system will be able to provide both high availability and disaster recovery services. Products and services for providing both high availability and disaster recovery data service exist but such products tend to be expensive and complex. Small and medium sized entities can have difficulties in deploying data storage systems that provide both high availability and disaster recovery services. Thus, it would be desirable to provide systems that provide high availability and disaster recovery data storage service with lower costs and less complexity.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4C illustrates the client-server environment of FIG. 4B wherein the fail-over secondary site has taken over operations and is accessing bulk data stored at the cloud storage service.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to the Microsoft SharePoint Server environment, other types of server systems may use the teachings in this document. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
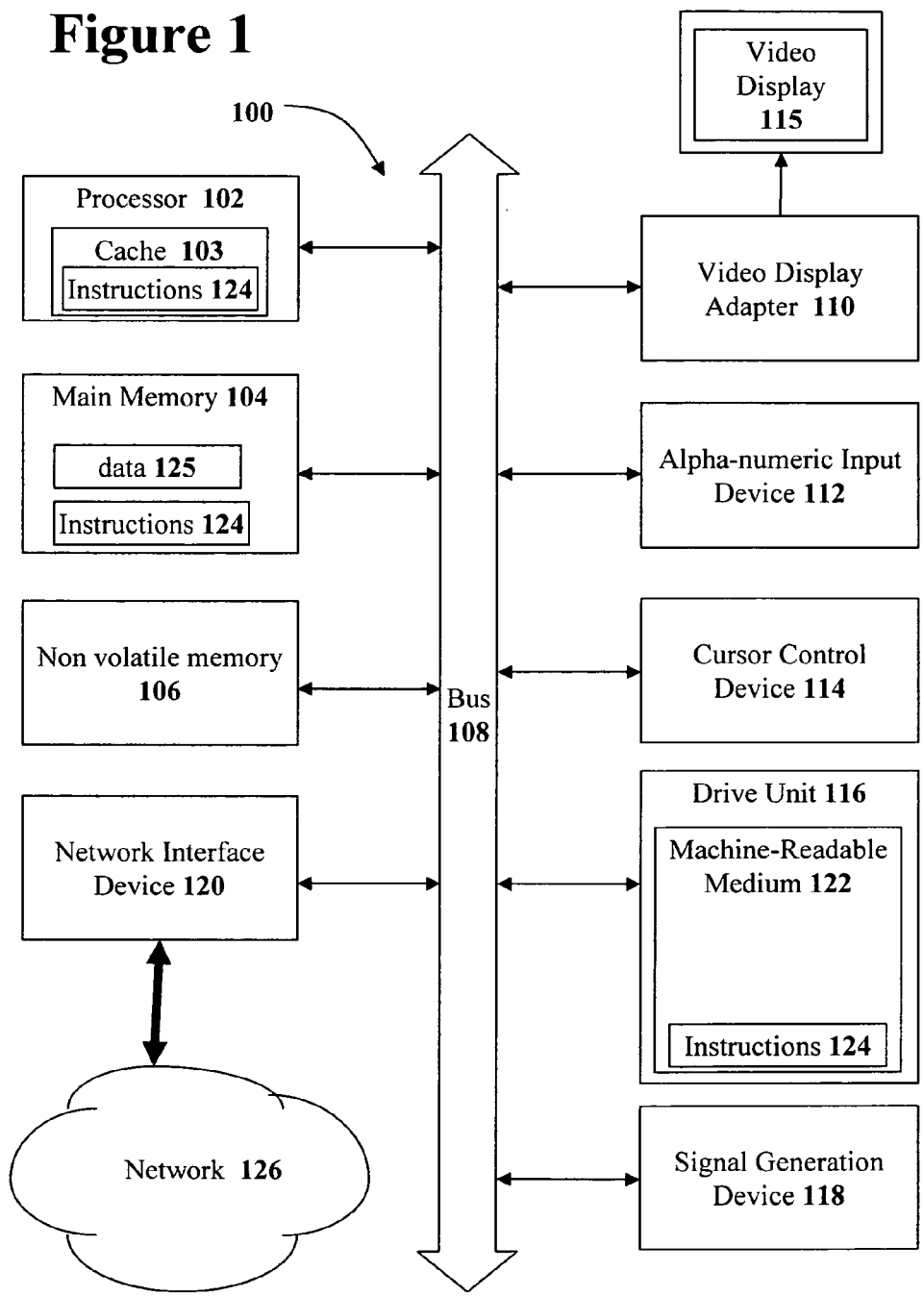
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a non volatile memory 106, which communicate with each other via a bus 108. The non volatile memory 106 may comprise flash memory and may be used either as computer system memory, as a file storage unit, or both. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, battery-backed RAM, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Server Systems

Client-Server computing is a computer paradigm wherein a centralized server system provides services to one or more client computer systems. Computer servers have been created to provide a wide variety of different services to client computer systems such as general file storage, email service, web site hosting, and database service.

Figure 2A:
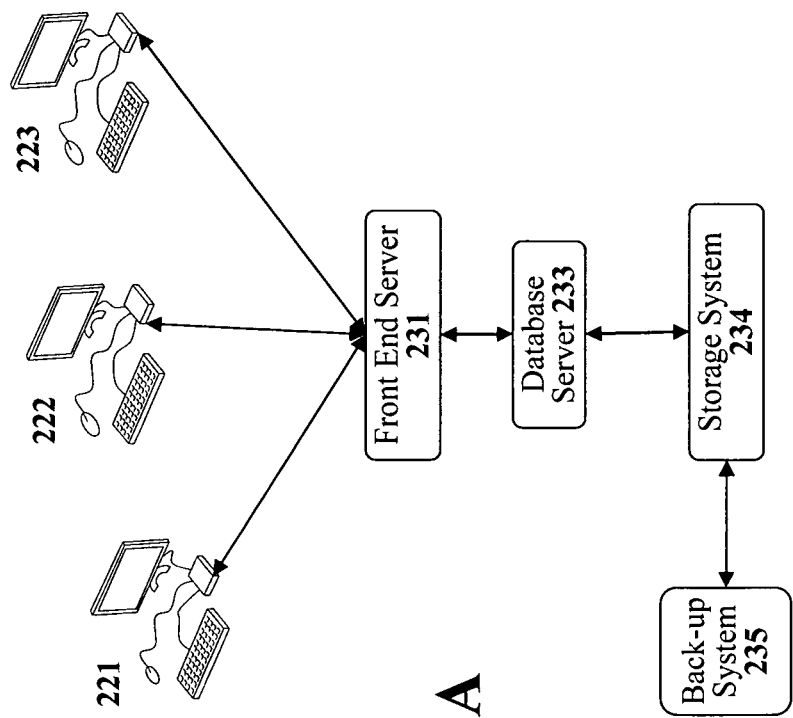
FIG. 2A illustrates a block diagram of an example client-server environment.

FIG. 2A illustrates a block diagram of an example client-server environment. In FIG. 2A, a front-end server system 231 provides a service to multiple client systems 221, 222, and 223. In the client-server environment of FIG. 2A, front-end server system 231 is supported by a database server 233 that provides database services to the front-end server 231. Furthermore, the database server 233 is supported by a storage system 234. The storage system 234 may be a storage area network (SAN).

A storage area network allows multiple computer applications (such as database server 233) to access remote computer storage devices (such as hard disk arrays, magnetic tape libraries, and optical disc storage devices) in a manner wherein the remote storage devices appear the same as storage devices directly attached to the local computer system. The use of a storage area network (SAN) allows multiple applications and servers to share a unified storage system. The use of unified shared storage simplifies storage administration since only the unified storage system need to be maintained instead of several different storage systems on several different servers. For example, by using a unified storage system 234, a single back-up system 235 can be used to perform data back-ups for all of the applications that use the storage system 234.

Back-Up Systems

Data back-up systems are a very basic method of implementing a disaster recovery system. Referring to FIG. 2A, if storage system 234 stores all of the data at a site and back-up system 235 creates a duplicate copy of the all the data on storage system 234, then back-up system 235 can be used to fully restore the entire data infrastructure of the site. Thus, if database server 233 malfunctioned and corrupted all of the data it had stored on storage system 234 then a back-up copy of that data on back-up system 235 could be used to restore the data back onto storage system 234 to resume operation of database server 233.

In order to provide a robust data recovery system, the back-up system 235 or back-up media (tapes, optical discs, etc.) from back-up system 235 should be moved to a different location than the site that houses front-end server 231, database server 233, and storage system 234. In this manner, a catastrophic disaster (such as a fire) could strike but the data infrastructure of FIG. 2A could be rebuilt with new hardware and the data could be restored from the off-site back-up.

In addition to providing disaster recovery services, the back-up system 235 can handle more mundane back-up data retrieval tasks. For example, if a user accidentally deleted an important file that deleted file could be restored from a recent back-up copy stored on the back-up system 235.

High Availability and Improved Disaster Recovery

The data back-up system 235 of FIG. 2A provides a very basic disaster recovery system. However, when a disaster (such as a fire) occurs it can take a long time to reconstruct the information technology infrastructure of FIG. 2A. The entire hardware infrastructure must first be rebuilt with new computer hardware and networking equipment. Then the software applications must be loaded onto the new computer hardware. Finally, the backed-up data must be restored onto the reconstructed information technology infrastructure thereby completing the restoration. For any large business or government operation, having such a large amount of down time is unacceptable.

Figure 2B:
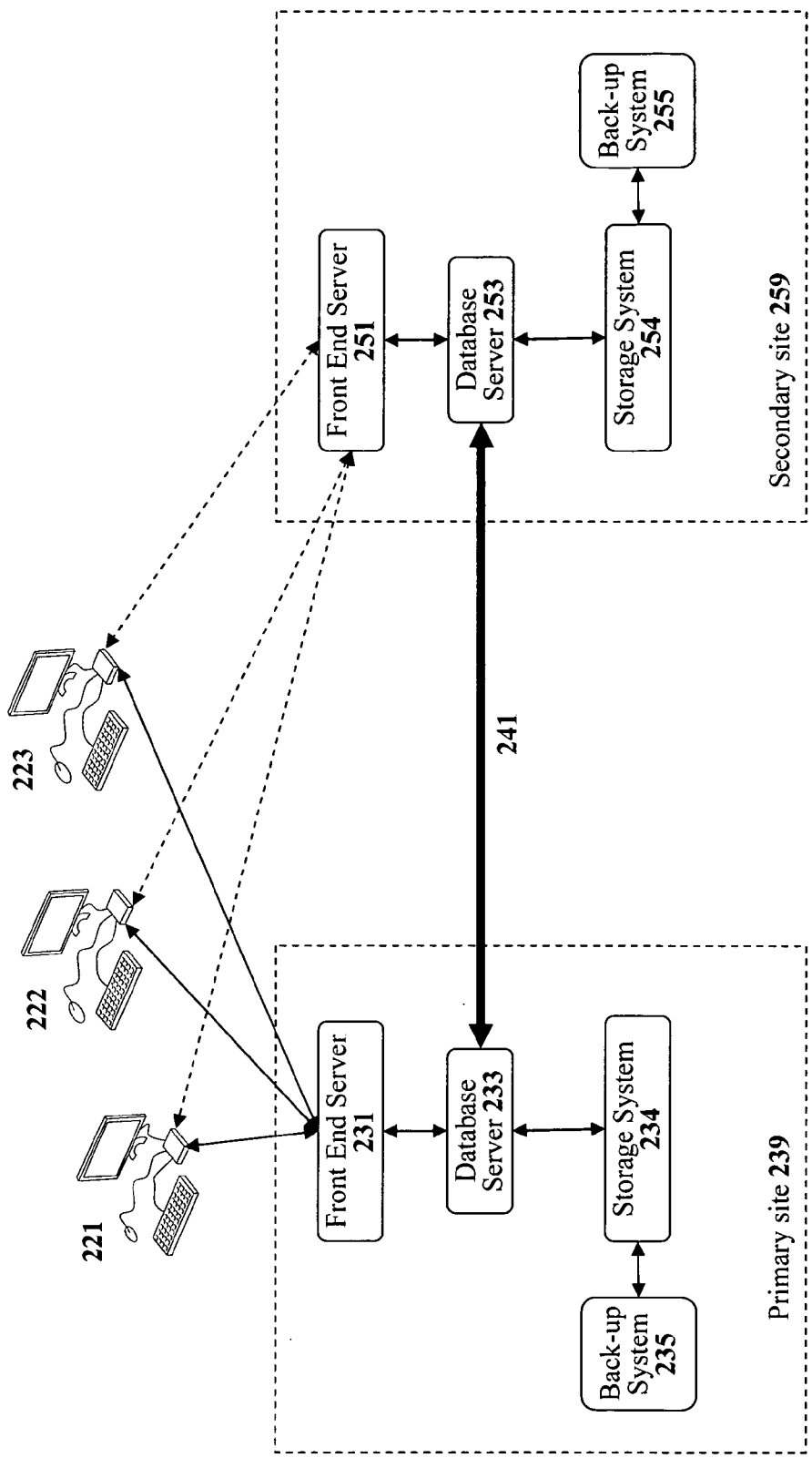
FIG. 2B illustrates the client-server environment of FIG. 2A with a fail-over secondary site that may be used if the primary site experiences a failure or undergoes maintenance.

To provide a more robust information technology infrastructure, many entities create a primary computer site and a secondary computer site that can quickly be used if the primary site experiences a catastrophic failure. FIG. 2B illustrates a block diagram of the server system from FIG. 2A used as a primary server site 239 and a secondary server site 259 that may be used if the primary server site 239 experiences a failure.

As illustrated in FIG. 2B, the primary server site 239 and the secondary server site 259 include the same basic components of a front-end server, a database server, and a storage system. The client systems 221, 222, and 223 will generally access the front-end server 231 at the primary site 239. However, if there is a some type of failure at the primary site 239, then the client systems 221, 222, and 223 can be directed to access the secondary server site 259.

For example, if the front-end server 231 was providing email service, an entry in a Domain Name Service (DNS) entry would designate front-end server 251 as a back-up server that could be accessed if the primary front-end server 231 was not responding. Thus, if a disaster were to strike at the primary site 239, then front-end server 251 at the secondary site 259 would immediately be available to handle service requests from the client systems 221, 222, and 223.

In order to immediately begin handling service requests the secondary site 259 must be kept up to date with the latest state information from the at the primary site 239. Ideally, the secondary site 259 will have all of the state information from the primary site 239 but it may be acceptable if the secondary site 259 is not completely up to date. Various different methods may be used to keep the secondary site 259 updated with state information. One common technique is to use communication link 241 between the primary site 239 and the secondary site 259 to transmit any data changes made at the primary site 239 and the secondary site 259. In the example of FIG. 2B, the database server 233 at the primary site 239 transmits local data changes to the database server 253 at the secondary site 259 such that the secondary database server 253 remains synchronized with the primary database server 233.

Various different methods may be used to maintain synchronization between the primary database server 233 and the secondary database server 253. One technique of updating the secondary database server 253 at the secondary site 259 is to use 'log shipping'. With log shipping, the database server 233 at the primary site 239 maintains a log of all the changes made to the primary database on database server 233. Then, on a periodic basis, the database server 233 transmits a batch of changes to the secondary database server 253. The secondary database server 253 then applies the received batch of changes to remain reasonably synchronized with the primary database server 233. Note that by collecting the changes and transmitting the changes in batches, the changes may be grouped together and compressed in order to efficiently use the communication link 241.

With log shipping, there is delay between when a change occurs in the primary database server 233 and when that change is eventually packaged up, transmitted, and applied to the secondary database server 253. If the primary site 239 experiences a failure before the latest batch of updates is transmitted, the secondary database server 253 will not be completely up to date such that a small amount of data may be lost. To reduce this potential loss of data between batches, database mirroring may be employed. With database mirroring, all of the changes that are applied to the primary database server 233 are immediately transmitted to the secondary site 259 and applied to the secondary database server 253. In this manner, the secondary database server 253 will be synchronized with the primary database server 233. However, this method requires a large bandwidth communication link 241 between the primary site 239 and the secondary site 259.

Maintaining the secondary fail-over site 259 is an expensive proposition due to all the hardware and software required to construct and maintain the secondary fail-over site 259. Furthermore, with either log shipping or database mirroring, the primary site 239 and the secondary fail-over site 259 must be coupled by a high-bandwidth communication link 241 in order to keep the secondary site 259 up-to-date with the latest database state information. Maintaining the high-bandwidth communication link 241 for the secondary fail-over site 259 that will rarely (or perhaps never) be used is an expensive recurring cost that companies would rather avoid or reduce. And even though the secondary site 259 acts as a live back-up of the primary site 239, some type of back-up system 235 is still required. For example, the back-up system 235 and 255 are still required in order to make periodic back-ups such that accidentally deleted data can be retrieved. Thus, it would be desirable to reduce the cost and complexity of implementing a secondary fail-over site and providing periodic data back-ups.

High Availability and Disaster Recovery at a Reduced Cost with No Link

To simplify the task of creating a fail-over secondary site, the present disclosure proposes using internet-based remote storage services for creating a data store that may be accessed by the secondary site. Internet-based remote storage services store data across the internet which is commonly drawn as a cloud in network diagrams thus these internet-based data storage services are commonly referred to as "cloud storage services". With the use of cloud-based storage system, the need for a high-bandwidth communication link between the two sites may be reduced or eliminated in some cases.

Cloud-based storage services offer customers reliable off-site data storage at relatively inexpensive prices. By using a cloud-based storage service, an information technology department can outsource the tasks of purchasing and maintaining a system for making data back-up copies. Furthermore, the task of ensuring that back-up copies and transported and stored at an off-site location for protection is completely eliminated since the data is backed-up across the internet to a remote location.

Figure 3:
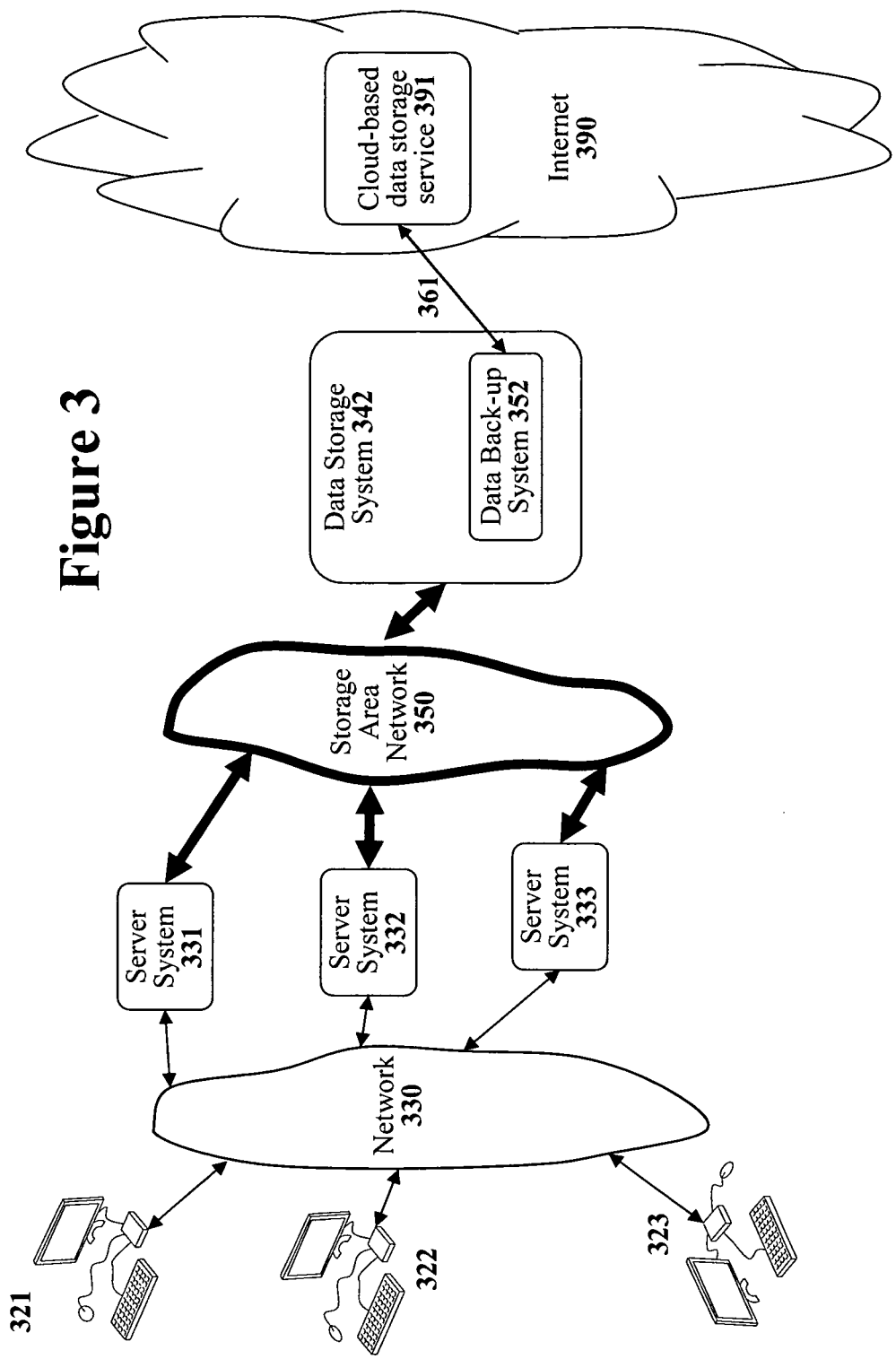
FIG. 3 illustrates a network diagram with a data storage system deployed on a storage area network (SAN) that may use a cloud-based data storage service for performing data back-ups.

FIG. 3 illustrates how a cloud storage service 391 may be used to provide off-site data storage services to an entity that maintains sever computer server systems. In the diagram of FIG. 3, a set of client computer systems (321, 322, and 323) access various servers (331, 332, and 333) that provide various services such as email service, file server services, database services, etc. In the particular arrangement of FIG. 3, the servers (331, 332, and 333) use a storage area network 350 to store data on a common data storage system 342. To back-up the data stored on storage system 342, the entity may use the cloud-based data storage service 391 available on the internet 390. Specifically, a data back-up system 352 backs-up data by transmitting that data to the cloud-based data storage service 391. (Note that the use of a storage area network 350 is just one particular implementation and not necessary in order to use a cloud-based storage service for data back-up operations.)

Cloud-based back-up systems can be implemented in many different ways. One specific cloud-based back-up system that may be employed is disclosed in the U.S. patent application "System And Method For Efficiently Creating Off-Site Data Volume Back-Ups" filed on Apr. 1, 2010 and having Ser. No. 12/798,321 which is hereby incorporated by reference. In that cloud-based back-up system, the data to be stored on the cloud has duplicate data removed, is compressed, and then encrypted before being transmitted to the cloud-based storage service. In this manner, back-up copies of data are created in a very efficient manner that significantly reduces the amount of data that must be transmitted across the internet to the cloud-based storage service. Furthermore, subsequent incremental back-ups may use the data that has already been transmitted to the cloud-based storage service. In this manner, incremental back-ups will only require relatively small amounts of data to be transmitted.

Figure 4A:
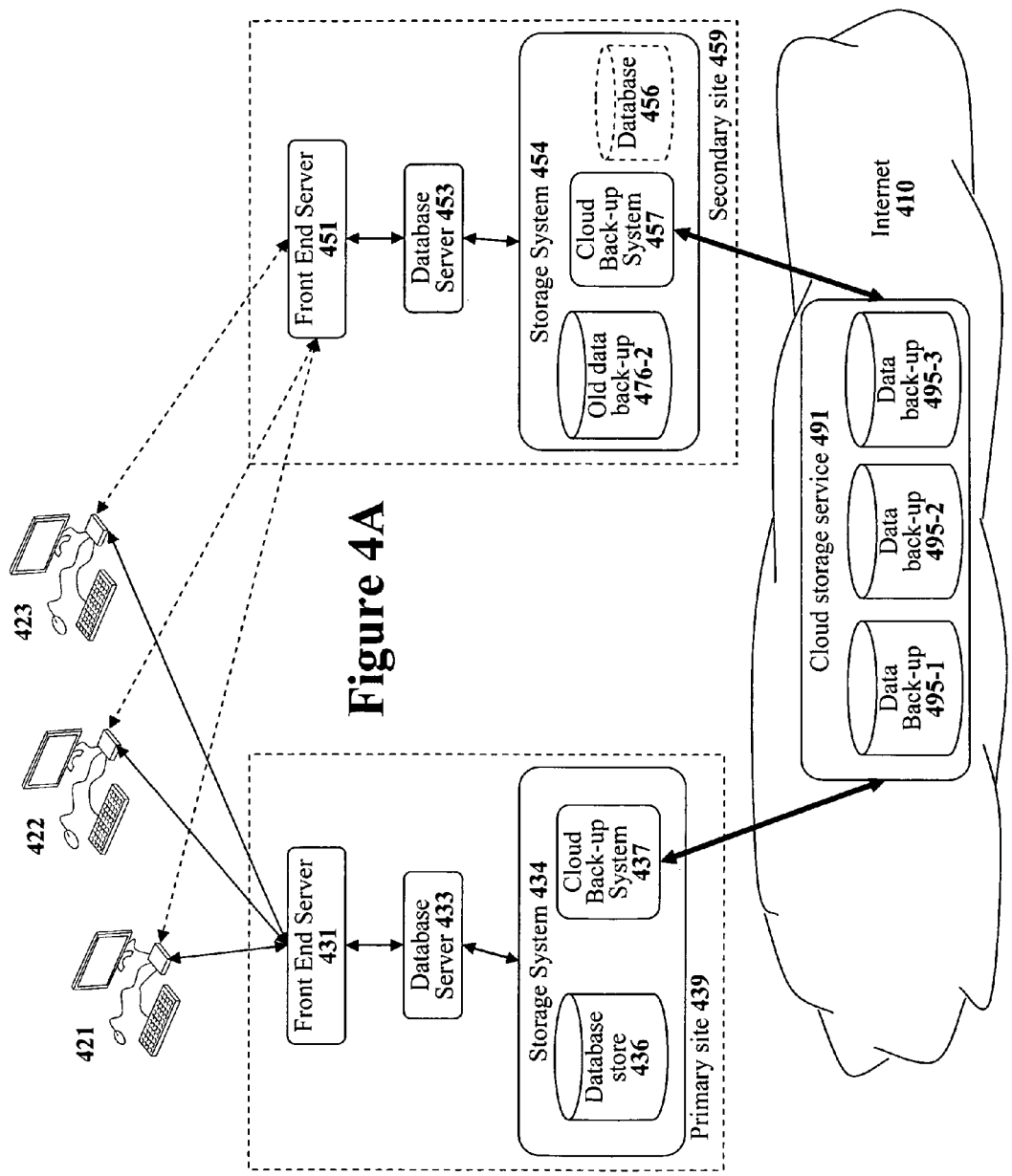
FIG. 4A illustrates a client-server environment with a fail-over secondary site that operates using data back-ups stored at a cloud-based storage service.

FIG. 4A illustrates one method of creating operating a secondary fail-over site using cloud-based back-ups. Referring to FIG. 4A, a primary site 439 operates primarily in the same manner as primary site 239 illustrated in FIG. 2B. Specifically, a front-end server 431 at the primary site 439 serves client computers (421, 422, and 423) using data from database server 433. The database server 433 uses a storage system 434 as a bulk storage system to store the actual raw database store 436. For example, a Storage Area Network (SAN) system may be used to store the database store 436. In one preferred implementation, the storage system 434 may be the storage system disclosed in the U.S. patent application "System And Method For Efficiently Creating Off-Site Data Volume Back-Ups" filed on Apr. 1, 2010 and having Ser. No. 12/798,321 which is hereby incorporated by reference.

In order to provide the secondary fail-over site 459 with data in case the secondary site 459 needs to become operational, the primary site 439 periodically backs-up the database store 436 stored on the storage system 434 using a cloud back-up system 437. Specifically, cloud back-up system 437 periodically creates back-up copies at a cloud storage service 491. For example, as illustrated in FIG. 4A, the cloud back-up system 437 has created three back-up copies (495-1, 495-2, and 495-3) at the cloud storage service 491 from the database store 436 at the primary site 439.

If the primary site 439 were to experience a temporary or catastrophic failure, an administrator could instruct the secondary site 459 to take-over the role of providing services to the client computers (421, 422, and 423) using secondary front-end server 451. In order to take over these duties, the secondary site 459 needs access to the most recent back-up copy of the database store 436. Thus, before commencing operation, the cloud back-up system 457 in the secondary site storage system 454 mounts the most recent back-up volume at the cloud storage service 491. For example, the cloud back-up system 457 may mount back-up volume 495-3 stored at cloud storage service 491. The database server 453 may then use that back-up volume 495-3 to support front-end server 451.

Note that if the storage system 454 is serving data directly from the cloud storage service 491 to the database server 453, then there may some latency while requested data is accessed from the cloud storage service 491. This latency is an undesirable performance drop. However, this latency can be mitigated in various different manners.

A first method of dealing with this latency is to completely eliminate the latency by copying the entire most recent database back-up (such as back-up volume 495-3) into the storage system 454 before having the secondary site being operating. This allows the data to be served from a local source. However, using this method will mean that no services can be provided to the client computers (421, 422, and 423) until the back-up volume is fully copied from the cloud storage service 491 to the storage system 454 at the secondary site 459. Copying a large database may take a significant amount of time and is thus an undesirable option.

A second method of reducing latency is to have the storage system 454 create a new local database volume 456 that references the back-up volume 495-3 stored at cloud storage service 491 for data that it does not yet have. Since only references to the data in the back-up volume 495-3 are needed, this new volume can be created very quickly. In this manner, as data requests are received, the storage system 454 will request data that it does not yet have from by referencing data back-up 495-3 at cloud storage service 491. However, as each referenced data item is accessed, the storage system 454 can store a local copy of the data in the new database volume 456 in the local storage system 454. In this manner, subsequent requests to the same data can be served using the local copy of the data. Specific details on this technique may be implemented can be found in the section entitled "Restoring a Backed-Up Data Volume" in the U.S. patent application "System And Method For Efficiently Creating Off-Site Data Volume Back-Ups" filed on Apr. 1, 2010 and having Ser. No. 12/798,321 which is incorporated by reference in its entirety.

A third method of mitigating the latency is to have the secondary site 459 take advantage of data storage systems that are able to identify duplicate data using data fingerprints. Data de-duplication is the process of identifying redundant data and then discarding duplicate data by having two or more data objects that have duplicate data point to a single copy of that duplicate data. One method of identifying duplicate data is to calculate statistically unique data fingerprints for sections of data and then identifying sections of data that have the same data fingerprints. Data duplication provides several advantages such as reducing the amount of storage space required and reducing the time needed to transmit data across communication lines. The system of FIG. 4A can take advantage of data de-duplication by using duplicate data that is available locally. Specifically, the storage system 459 may periodically load recent database back-up copies into the local storage system 454. Then, by locating locally available data (data portions from recent back-up copies) with the exact same fingerprints, the storage system 454 can quickly serve data using the local copy. An example of reduced latency using data-duplication is provided in the following paragraphs.

To prepare for reducing latency by using data duplication with fingerprints, the cloud back-up system 457 periodically uploads old databases from the cloud storage service 491 into the local storage system 454. FIG. 4A illustrates an old data back-up 476-2 that has been uploaded into the storage system 454 from the cloud storage service 491. The uploading of old database may occur less frequently than the cloud back-up system 437 at the primary site creates back-up volumes in order to reduce bandwidth usage. The uploaded database 476-2 is comprised of data sections wherein each data section has a statistically unique data fingerprint that is derived from the data section. (The actual creation of the data fingerprints may occur in any location but in one embodiment the data fingerprints are created by the primary storage system 434 that created the back-up volume.)

When a situation occurs requiring that the secondary site 459 take over operation, the cloud back-up system 457 at the secondary site 459 creates a new data volume 456 by loading up all the data fingerprints from the most recent back-up volume 495-3 at the cloud storage service 491. Although the loaded data fingerprints are associated with data sections in the most recent back-up volume 495-3 at the cloud storage service 491, any data sections that have the same statistically unique fingerprints may be used. Thus, if there are data sections in the uploaded old database 476-2 that have the exact same data fingerprints, then the storage system 454 may respond to requests for that data using the local copy. When the storage system 454 is able to use a local copy of the fingerprinted data, there will be no latency when responding to such requests. Since much of the data in a large database remains the same, there will tend to be a large amount of duplicate data between an older version of the database 476-2 that is available locally and the most recent back-up of the database 495-3 available on the cloud storage service 491. Thus, the storage system 454 will be able to quickly respond to many data requests using local copies of the same data by using duplicate data sections in the locally mounted old database 476-2.

The fail-over back-up system of FIG. 4A provides the same type of fail-over back-up system illustrated in FIG. 2B but at a lower cost since no high-bandwidth communication line needs to couple the primary site 439 with the secondary site 459. By eliminating that expensive recurring cost, the cost of maintaining a secondary fail-over site is greatly reduced. However, the secondary fail-over back-up system of FIG. 4A may lose a significant amount of data when a problem occurs. Specifically, all of the changes made to the database store 436 at the primary site 439 since the latest back-up copy stored at the cloud storage service 491 may be lost. This amount of data loss may be unacceptable for many applications.

High Availability and Disaster Recovery with Slower Communication Link

Figure 4B:
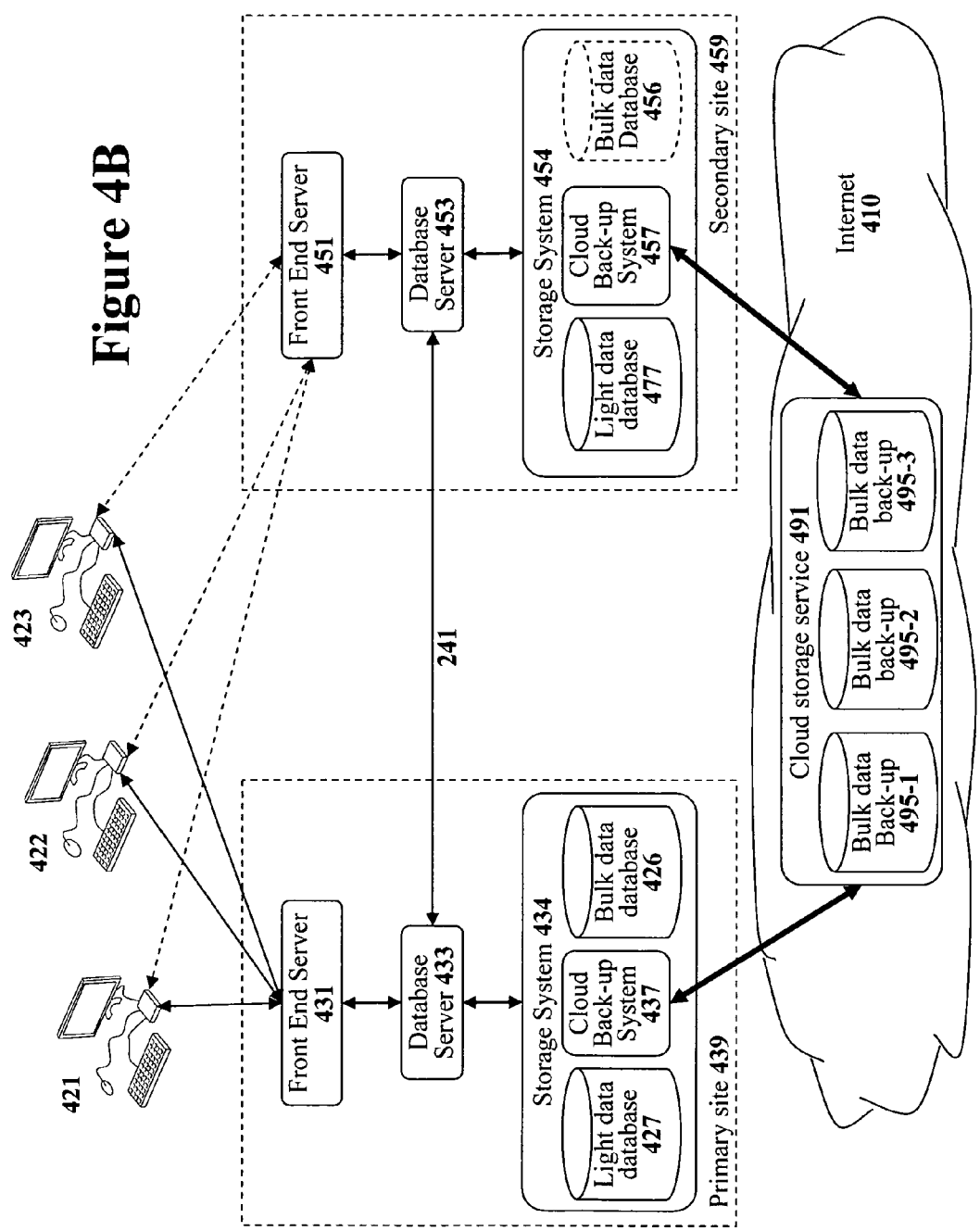
FIG. 4B illustrates the client-server environment of FIG. 4A wherein a portion of the data needed to provide services is transmitted to the fail-over secondary site with database mirroring or log shipping.

FIG. 4B illustrates a modified version of the fail-over arrangement of FIG. 4A. In the fail-over arrangement of FIG. 4B, the data used to run the primary site has been bifurcated into a bulk data database 426 and a light data database 427. The bulk data database 426 may be used to store large data items and data items that do not frequently change. The light data database 427 may be used to store small data items and data items that change frequently. The data in these two databases may come from the database server 433 or from the front-end server 431.

In the fail-over arrangement of FIG. 4B, the primary database server 433 uses a communication link 441 to keep the light data database 427 synchronized with copy of the light data database 477 at the secondary site 459. Specifically, the primary database server 433 may communicate any changes made to the light data database 427 to the secondary database server 453 such that the secondary database server 453 may update its local light data database 477.

The bulk data database 426 at the primary site 439 may be used to store large data objects and data objects that change much less frequently. These data objects may include files such as word processing documents, PDFs, and images. In the arrangement of arrangement of FIG. 4B, the bulk data database 426 will be backed-up on a periodic basis to the cloud storage service 491.

When disaster causes the primary site 439 to no longer function, the situation will be as depicted in FIG. 4C. In FIG. 4C, the primary site 439 has failed and the secondary site 459 of FIG. 4B needs to begin providing services. Specifically, the secondary front-end server 451 may begin handling requests from clients 421, 422, and 423 by having the secondary database server 453 use the light data stored in the light data database 477 which contains the same data that was in primary light data database 427. When bulk data is required, the storage system 454 will access the latest back-up of the bulk data database 495-3 that is stored at the cloud storage service 491.

As set forth with reference to the system of FIG. 4A, various techniques can be used to reduce the latency of accessing the bulk data database 495-3. Specifically, the full bulk data database 495-3 may be copied to the storage system 454, a new bulk database 456 may be created that references the full bulk data database 495-3 and caches data locally, or the storage system 454 may access duplicate data from an older version of a database (not shown) that is available locally in the storage system 454.

The fail-over arrangement of FIGS. 4B and 4C, provides advantages over the fail-over arrangement of FIG. 4A. With the fail-over arrangement of FIGS. 4B and 4C, the system will lose less data since all (or most) of the light data will already be replicated over at the secondary site 459 using database mirroring or log shipping across the communication line 241. Only the data stored in the bulk data database 426 that is not yet in the most recent back-up at the cloud storage service 491 will be lost if there is a catastrophic disaster at the primary site 439. If most of the data stored in the bulk data database 426 changes only rarely, very little data will be lost Furthermore, since the light data for the secondary database server 453 will be locally available in light data database 477, the performance of the secondary site in FIG. 4C will be better than the secondary site in FIG. 4A.

Although the fail-over arrangement of FIGS. 4B and 4C is much improved over the fail-over arrangement of FIG. 4A, there are still some inadequacies. For example, there still may be significant data losses since all the changes made to the bulk data database 426 since the most recent back-up will be lost. Furthermore, accessing the bulk data back-up from the cloud storage service 491 may be slow since the data stored at the cloud storage service 491 may be compressed and encrypted to reduce storage requirements and protect the security of the data. Decompressing and decrypting the data will thus add latency to accessing the bulk data. Thus, the fail-over arrangement depicted in FIGS. 4B and 4C may be further improved.

Figure 4D:
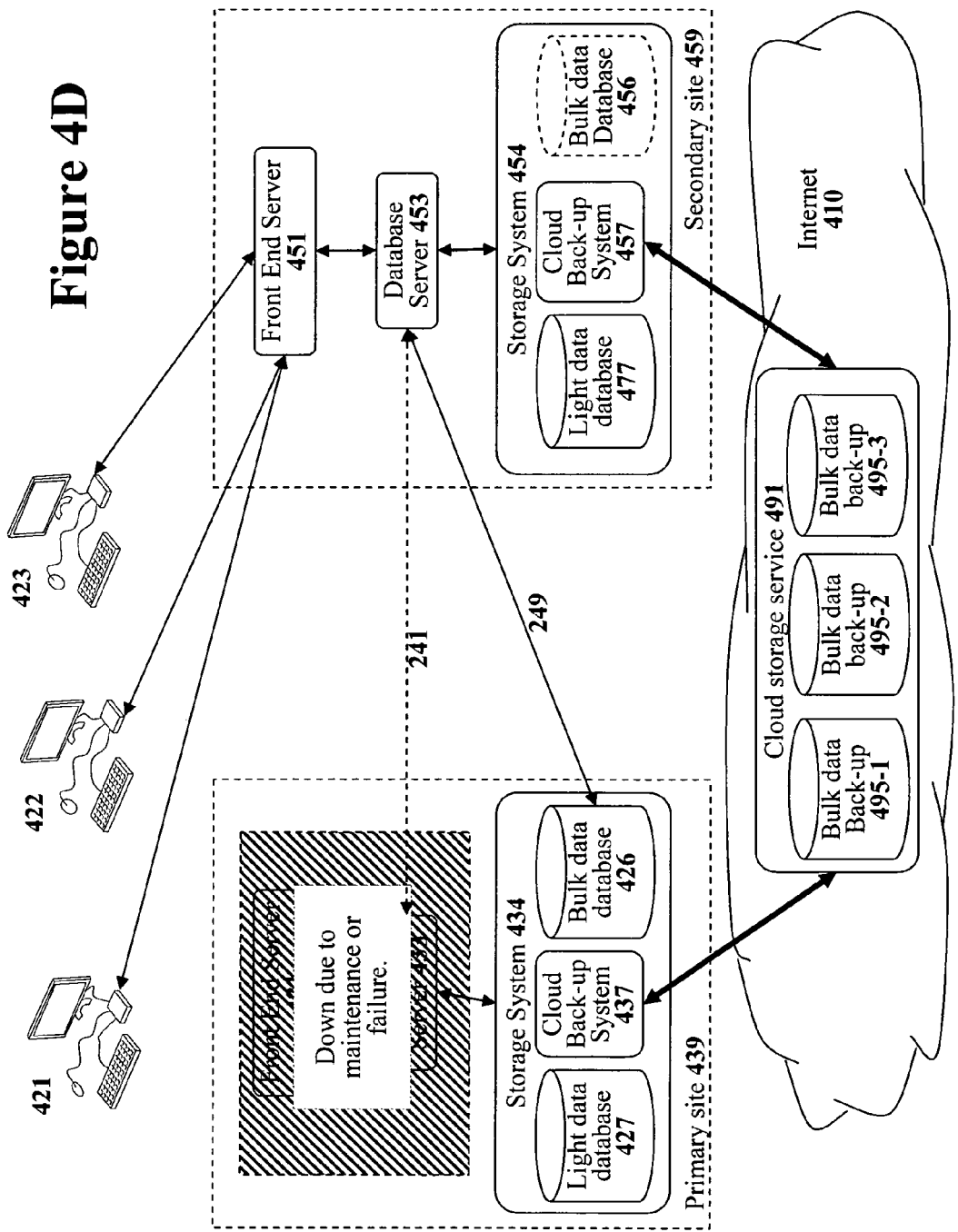
FIG. 4D illustrates the client-server environment of FIG. 4B wherein the fail-over secondary site has taken over providing services but is directly accessing some data available from the primary site.

FIG. 4D illustrates a further improved fail-over arrangement. In the system arrangement of FIG. 4D, the primary storage system 434 is a network accessible storage system that may be accessed remotely. Thus, the data in the primary storage system 434 may be made available for access by the secondary site 459 across some communication channel 249. This may be implemented by coupling storage system 434 to the internet (such that communication channel 249 is the internet) and allowing secondary database server 453 to access the storage system 434 upon providing proper credentials. Alternatively, the storage system 434 may be available across a private communication link. For example, a single private communication link 241 may be used for keeping the light data database 477 updated during normal operation and then used for remote access to the primary storage system 434 when the primary server is in maintenance or failure situation.

FIG. 4D illustrates the server arrangement in a maintenance or failure situation wherein the front-end server 431 and/or the data server 433 at the primary site 439 are no longer available for use. In such a failure or maintenance situation, the secondary front-end server at secondary site 459 may take over the providing services to the client systems 421, 422, and 423 without losing any data at all. Specifically, for light data the database server 453 at the secondary site 459 would access its local version of the light data database 477 and for bulk data the database server 453 would access the current bulk data database 426 at the primary site 439. In a system that has divided the data well, the most frequently accessed data would reside in the local light data database 477 such that there would be no latency for most operations. The less frequent accesses to the remote bulk data database 426 might involve some latency and/or reduced bandwidth due to the database server accessing the bulk data database 426 from a remote location.

The fail-over systems of FIGS. 4B to 4D provides some advantages over the fail-over system depicted in FIG. 2B. For example, the high-bandwidth communication link 241 in the system of FIG. 2B is not required in the fail-over systems of FIGS. 4B to 4D. Instead, only a smaller communication link 441 is required to carry the light data to the secondary database server 453 in the systems of FIGS. 4B to 4D. The communication link 441 that links the two database servers 433 and 453 may simply be a standard internet connection that uses encrypted tunneling.

The fail-over systems of FIGS. 4A to 4D do not require an independent back-up solution such as the back-up systems 235 and 255 depicted in the arrangement of FIG. 2B. Instead, the arrangements of FIGS. 4A to 4D use a cloud-based back-up system 437 that may be an integrated part of storage system 434. The cloud-based back-up system inherently achieves the goal of having an off-site back-up of data. Furthermore, a single cloud-based storage account at cloud-based storage service 491 may be shared between both the primary site 439 and the secondary site 459 such that only a single back-up system needs to be maintained.

An Example Secondary Site with SharePoint Servers

Figure 6A:
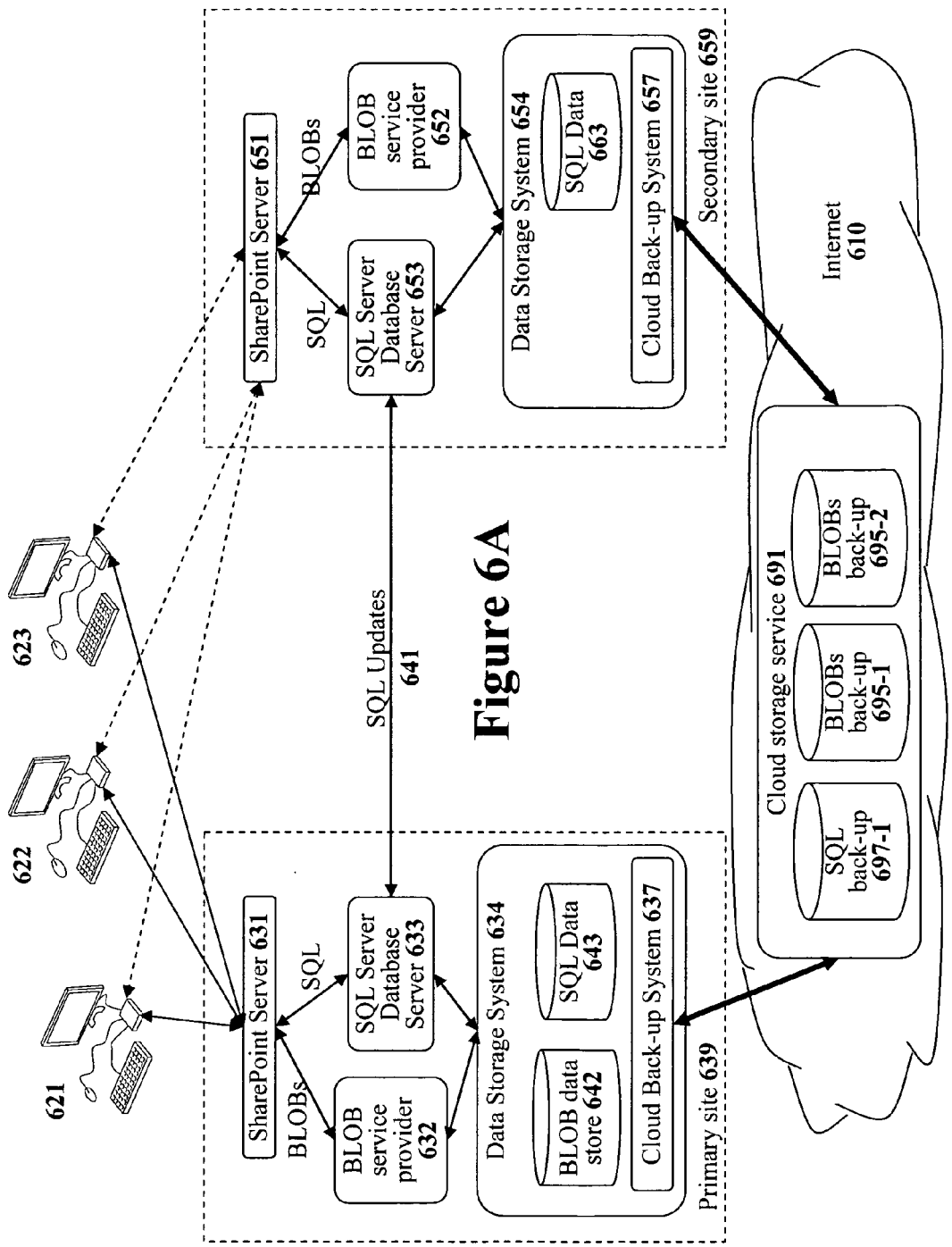
FIG. 6A illustrates a primary SharePoint server farm and secondary fail-over SharePoint server farm that are coupled by a communication link and a shared cloud storage system.
Figure 6B:
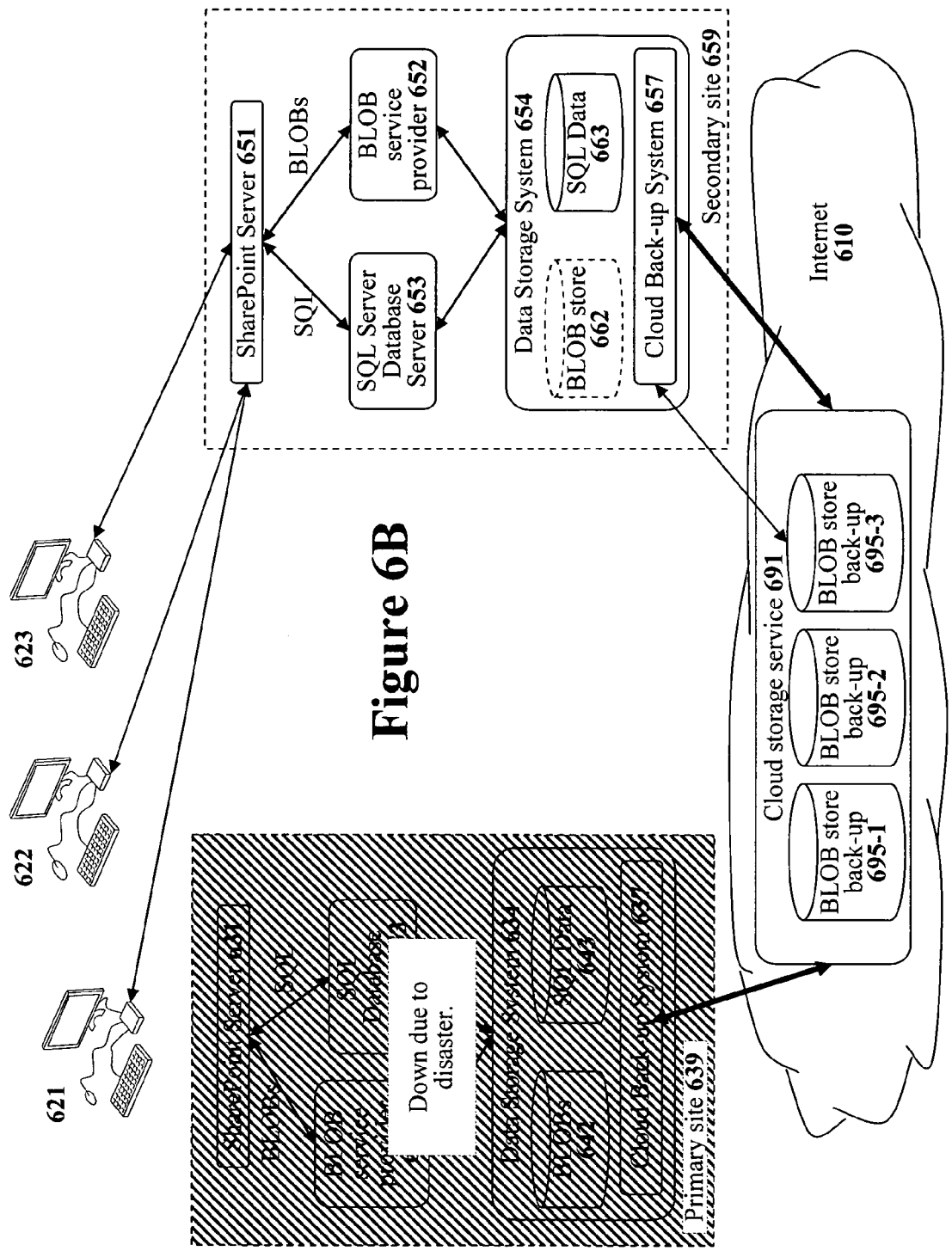
FIG. 6B illustrates the SharePoint server farms of FIG. 6A after the primary SharePoint server farm has failed and the secondary fail-over SharePoint server farm has taken over operations.
Figure 6C:
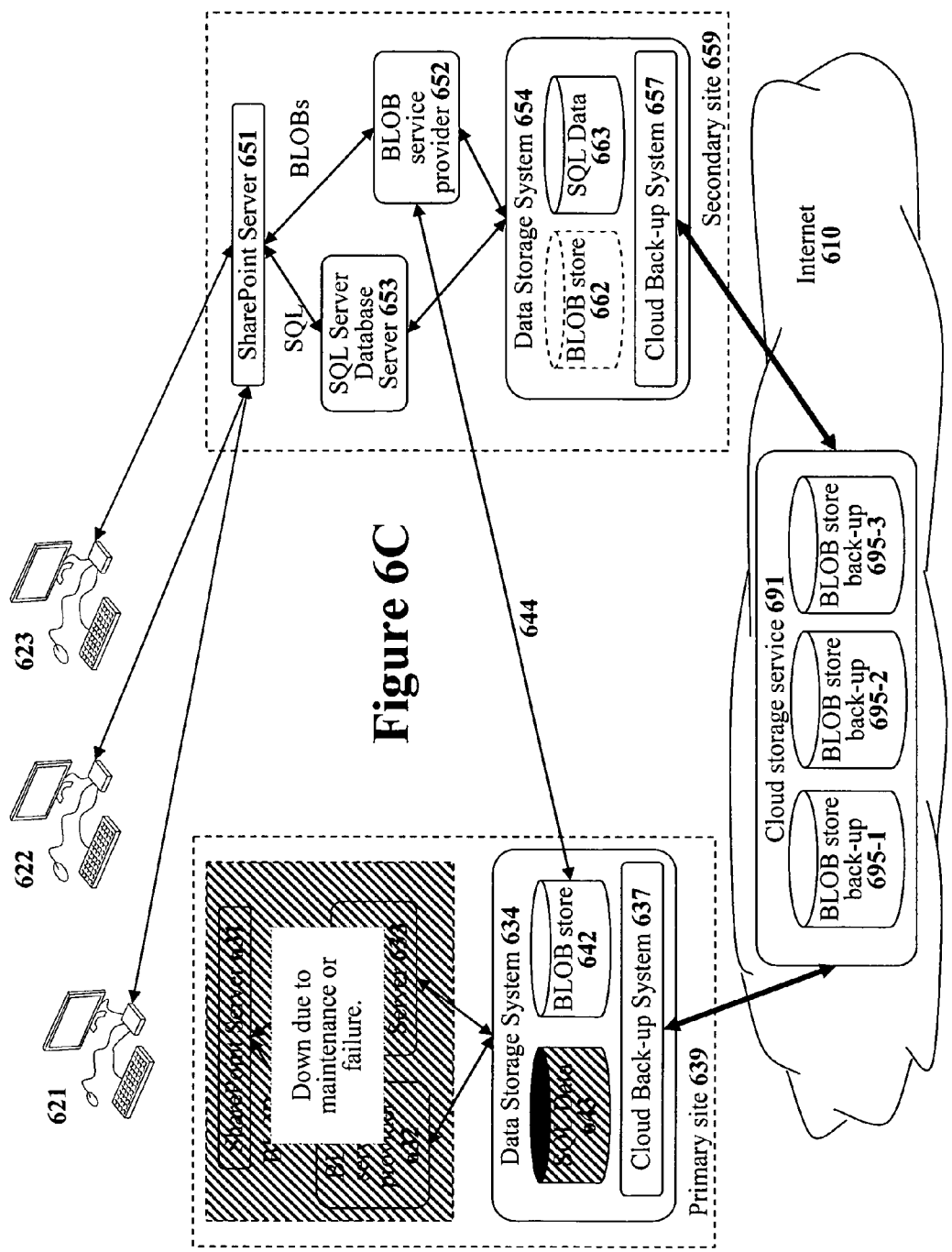
FIG. 6C illustrates the SharePoint server farms of FIG. 6A after a portion of the primary SharePoint server farm is unavailable and the secondary fail-over SharePoint server farm has taken over operations but is accessing some data stored at the primary SharePoint server farm.

To fully describe the fail-over system disclosed in FIGS. 4A to 4C, a detailed example of one specific deployment is disclosed with reference to FIGS. 6A to 6C. Referring to FIG. 6A, a Microsoft SharePoint server 631 is deployed at a primary site 639 for providing services to several client computers 621, 622, and 623. The SharePoint server 631 may provide standard web server services along with other services to the client computer systems. Microsoft SharePoint servers are often used as a collaboration system wherein users can share documents with each other.

A Microsoft SharePoint server 631 is supported by a SQL Server database server 633 that provides data to the SharePoint server 631. In a first mode of operation, the SQL Server database server 633 can be used to provide all of the data needed by the SharePoint server 631. Specifically, the SQL Server database server 633 serves both meta-data for implementing the SharePoint site and bulk documents shared by the SharePoint users. (The bulk documents may include spreadsheets, word processing documents, and other common document files.)

Although this first mode of operation works fine for small SharePoint deployments, this mode of operation is not ideal for larger SharePoint systems. Specifically, the SharePoint server 631 and SQL Server database server 633 may not operate efficiently since the SQL Server database server 633 will have to handle a very large number of data requests. Furthermore, many of the data requests issued to the SQL Server database server 633 will be for Binary Large OBjects (BLOBs) that are not handled efficiently by a standard relational database such as the SQL Server database server 633. For example, a typical SharePoint server 631 will be used to share binary large objects (BLOBs) such as word processing documents, images, PDFs, videos, and other large data object files. Although a relational database such as the SQL Server database server 633 can handle such BLOBs, such BLOBs can be more efficiently handled by a file system. Thus, using a SharePoint server 631 that is only supported by a SQL Server database server 633 for all its data requirements is not a solution that can scale up well.

To allow a SharePoint server deployment to scale up to large sizes, Microsoft created an Application Programming Interface (API) into SharePoint that allows SharePoint to store large data objects in a storage system that is separate from the SQL relational database used to support SharePoint. Specifically, Microsoft first introduced an API for External BLOB Storage (EBS) in the 2007 version of SharePoint. More recent versions of SharePoint also support a newer API called Remote BLOB Storage (RBS) for storing BLOBs. The EBS and RBS interfaces allow the SharePoint server to operate in a second mode of operation that allows the data storage requirements to be split among two different data storage systems. Specifically, FIG. 5 illustrates a block diagram showing how a SharePoint server 510 may use both a SQL database and a BLOB storage system (either EBS or RBS) to store data.

Figure 5:
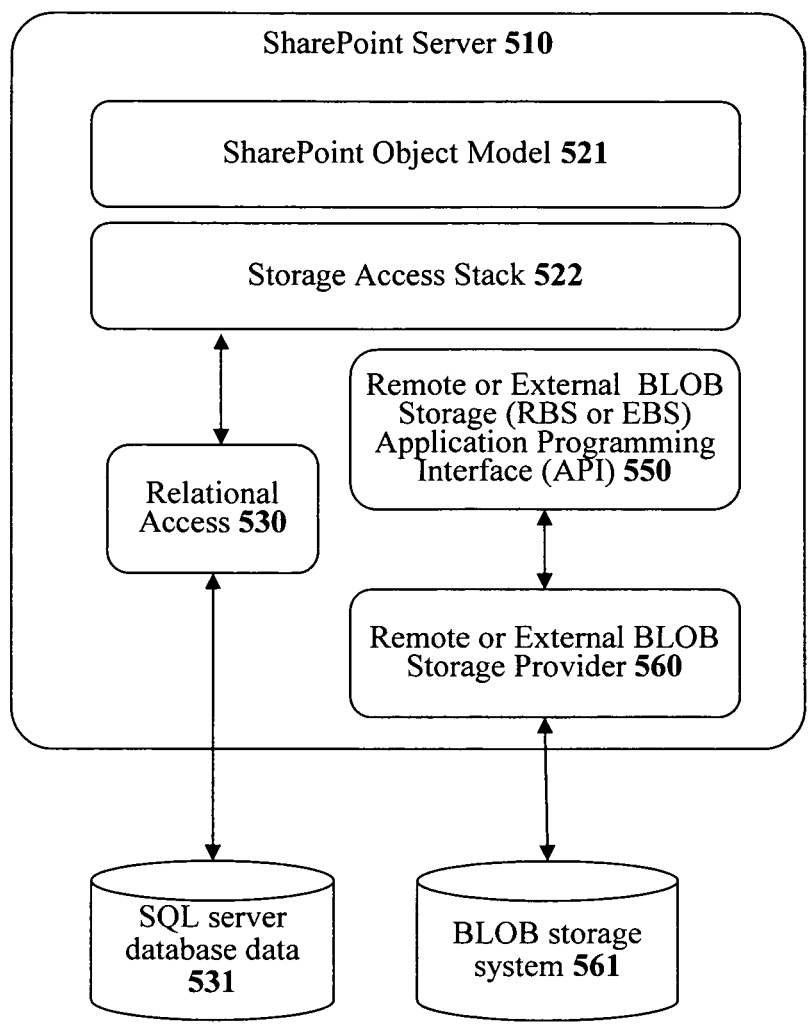
FIG. 5 illustrates a block diagram of a SharePoint system that uses both a SQL database and a remote BLOB storage (RBS) system for storing data.

Referring to FIG. 5, SharePoint server 510 uses a SharePoint Object Model 521 for handling data objects. The data objects are stored using a storage access stack 522. In all SharePoint systems, the storage access stack 522 uses standard relational data access 530 to access data on a SQL Server database 531. The meta-data for implementing the SharePoint server 510 is stored in the SQL Server database 531.

To scale up the storage system for the SharePoint server 510, a SharePoint Server 510 may also support storing binary large data objects (BLOBs) with a Remote or External BLOB Storage (RBS or EBS) system. Specifically, a Remote or External BLOB Storage (RBS or EBS) Application programming interface (API) 550 allows a Remote or External BLOB Storage (RBS or EBS) "provider" 560 to provide BLOB storage services. To use a BLOB storage provider, the SharePoint server 510 creates BLOB identifiers that are stored in the SQL Server database 531. The BLOB identifiers are then linked to BLOBs stored using the Remote or External BLOB Storage (RBS or EBS) provider 560. Thus, the Remote or External BLOB Storage (RBS or EBS) provider 560 is an added-on software module that must handle requests to store BLOBs that are associated with a BLOB identifier and retrieve BLOBs using an associated BLOB identifier. The Remote or External BLOB Storage (RBS or EBS) provider 560 will physically store and retrieve BLOBs using some type of BLOB storage system 561. The BLOB storage system 561 may be a file system, a database designed to handle BLOBs, or any other storage system designed to handle BLOBs.

Referring back to FIG. 6A, the SharePoint Server 631 at the primary site 639 stores a first portion data using a SQL Server database server 623 and stores a second portion data (the BLOB data) with a BLOB service provider 632. In the embodiment of FIG. 6A, both the SQL Server database server 623 and the BLOB service provider 632 share the same data storage system 634 but separate data storage systems may be used in other embodiments. The data storage system 634 stores the data from the SQL Server database server 623 in a SQL data volume 643 and stores the data from the BLOB service provider 632 in a BLOB storage volume 642.

The data storage system 634 includes a cloud-based back-up system 637 that may be used to back-up data at a cloud storage service 691 available on the internet 610. As illustrated in FIG. 6A, the cloud storage service 691 is currently storing a SQL database back-up volume 697-1 and two BLOB back-up volumes (695-1 and 695-2). The back-up volumes stored at the cloud storage service 691 may be used to retrieve data that has accidentally been deleted or may be used when a disaster occurs.

To provide reliable service, a fail-over secondary site 659 is maintained to provide services to the client computers 621, 622, and 623 if the primary site 639 experiences some type of failure. Like the primary site 639, the secondary site 659 has a SharePoint server 651 for providing services to the client computers 621, 622, and 623. The SharePoint server 651 is supported by a SQL Server database server 653 and a BLOB service provider 652. To keep the SharePoint server 651 at the secondary site 659 ready for operation, updates applied to the SQL Server database server 633 at the primary site 639 are transmitted across communication link 641 and applied to the SQL Server database server 653 at the secondary site 659. The secondary SQL Server database server 653 stores the SQL data 663 in the local data storage system 654.

Although the changes to the SQL Server database server are updated at the secondary site 659, the changes made by the primary SharePoint Server 631 to the BLOB service provider 632 are not immediately transmitted to the secondary site 659. Since the BLOB data can account for 90% of the total data volume, this greatly reduces the amount of data that must be transmitted across communication link 641. Instead, the BLOB data 642 at the primary site 639 is regularly backed-up using the cloud back-up system 637. The cloud back-up system 637 stores the back-up volumes at the cloud storage service 691 such that the back-up volumes are accessible by the secondary site 659.

The back-up volumes created by the cloud back-up system 637 can be created quickly and efficiently. Incremental back-ups only need to update the portions of a data volume that have changed since the last back-up. And even when full back-ups are performed, techniques that eliminate data duplication can greatly reduce the amount of data that needs to be transmitted to the cloud storage service 691 when identical data already exists at the cloud storage service 691. Details on constructing a cloud back-up system 637 that identifies duplicated data and eliminates the need for transmitting data duplicates can be found in the U.S. patent application "System And Method For Efficiently Creating Off-Site Data Volume Back-Ups" filed on Apr. 1, 2010 and having Ser. No. 12/798,321 which is hereby incorporated by reference in its entirety. The BLOB data created by a SharePoint server is an ideal candidate for data duplication elimination since SharePoint servers create a completely new BLOB data file in addition to keeping an old existing data file when that old BLOB data file is modified.

The server system arrangement of FIG. 6A allows a primary server site 639 to be supported by a secondary fail-over service site 659 without significant recurring costs. For example, the communication link 641 used to keep the SQL Server database server 653 at the secondary site 659 updated does not need to be a high-bandwidth connection since by excluding the BLOB updates, the vast majority of the data volume is eliminated. A secured tunnel connection using an ordinary interne connection may suffice instead of needing a private Wide Area Network (WAN) connection. Furthermore, the need for independent back-up systems at both sites is eliminated by using a single shared cloud storage service 691 that can service both sites.

FIG. 6B illustrates how the arrangement of FIG. 6A operates when a catastrophic disaster (such as a fire) causes the entire primary site 639 to fail. In such a disaster recovery (DR) situation, the data storage system 654 at the secondary site mounts the most recent BLOB back-up volume (such as BLOB back-up volume 695-3) stored at the cloud storage service 691. The data storage system 654 will use the data from that most recent BLOB back-up volume to create a local BLOB volume 662. The SharePoint server 651 at the secondary site 659 can the begin providing services to the client computers 621, 622, and 623. Specifically, the secondary SharePoint server 651 is supported by the SQL Server database server 653 using mirrored SQL data 663 and supported by the BLOB service provider 652 using the BLOB back-up data retrieved from the cloud storage service 691. Note that in this situation, the system will lose some data because any changes to the BLOB data volume 642 that have been made since the latest back-up on the cloud storage service 691 will be lost. However, with a back-up system that eliminates duplicated data, the BLOB data can be backed-up quickly and efficiently on a regular basis. In one embodiment, the BLOB data store is backed-up several times a day to keep the back-up database relatively up-to-date. But at a minimum, the BLOB data store could easily be backed-up at least every night.

FIG. 6C illustrates how the arrangement of FIG. 6A may operate when only a portion of the primary site 639 becomes unavailable. For example, if the SharePoint server 631, the SQL Server database server 633, or the BLOB service provider 632 were to fail or be taken down to perform maintenance then the primary site 639 could no longer provide services to the client computers 621, 622, and 623. However, as long as the data storage system 634 of the primary site 639 remains operational, then the secondary site 659 can take over providing services to the client computers 621, 622, and 623 without losing any data by directly accessing the data stored in the data storage system 634 of the primary site 639.

When a failure occurs that prevents the primary site 639 from providing client services yet allows the primary data storage system 634 to continue functioning, then the BLOB service provider 652 at the secondary site 659 may be able to establish a connection 644 to the data storage system 634 at the primary site 639. This connection 644 will allow the BLOB service provider 652 of the secondary site 659 to directly access the most current BLOB data 642 which is stored in the data storage system 634 at the primary site 639. In this manner, the SharePoint server 651 at the secondary site 659 will be able to provide client services with the support of the SQL Server database server 653 using the local SQL data 663 and the support of the BLOB service provider 652 accessing the current BLOB data volume 642 on the data storage system 634 at the primary site 639.

In some embodiments, the BLOB service provider 652 may use various caching systems improve performance. A first caching technique would be to have the data storage system 654 'pre-cache' by having the data storage system 654 periodically load in a BLOB back-up from the cloud storage service 691. Thus, the cloud back-up system 657 may load a recent BLOB back-up (such as BLOBs back-up 695-3) as BLOB store 662 in data storage system 654. The BLOB service provider 652 will then access a requested BLOB locally from of BLOB store 662 in data storage system 654 if it is available in BLOB store 662. This will result in improved performance for those BLOB items found within BLOB store 662.

When the BLOB service provider 652 cannot access a requested BLOB locally from the local BLOB store 662 then the BLOB service provider 652 will request the BLOB from BLOB store 642 at primary site 639 across connection 644. When this occurs, the BLOB service provider 652 may store a copy of that BLOB into the local BLOB store 662 such that subsequent requests from that particular BLOB can be serviced quickly.

Note that the solution depicted in FIG. 6C requires the data storage system 634 to be network accessible. However, that is exactly how Storage Area Networks (SANs) operate. Although accessing the remote BLOB data volume 642 will likely involve some latency, this may be acceptable during a temporary maintenance time period. It should also be noted that the cloud back-up system 637 may continue making period back-ups of the BLOB data volume 642 that can be used if a complete disaster were to take out the primary site 639.

Upon the completion of maintenance (or the repair of a failed element), the primary site 639 should be reactivated in order to obtain the best performance by accessing the BLOB data locally. Before switching back to the primary site 639, the data in the SQL data volume 663 at the secondary site 659 must be copied to the data storage system 634 at the primary site 639. This may be performed by having the two SQL databases (633 and 653) re-establish communication and synchronize their SQL data volumes using the SQL data volume 663 as the data source. Alternatively, service could be temporarily suspended, the SQL data volume 663 at the secondary site could be backed-up at the cloud storage service 691, and then that data could be used to restore a SQL data volume 643 at the primary site 639.

Additional Server Sites for Remote Offices

As an organization grows, that organization may wish to open up geographically remote work sites such as remote satellite offices. To support the users at a remote satellite site, an information technology department may wish provide the users at the remote satellite site with access to the same data available at the organization's headquarter site. However, when a user at a geographically remote satellite site attempts to access a data repository located at the organization's headquarters site there may be significant amount of latency and slow data retrieval when accessing that main data repository. Thus, it would be desirable to find methods of reducing performance problems experienced at remote sites.

Figure 7A:
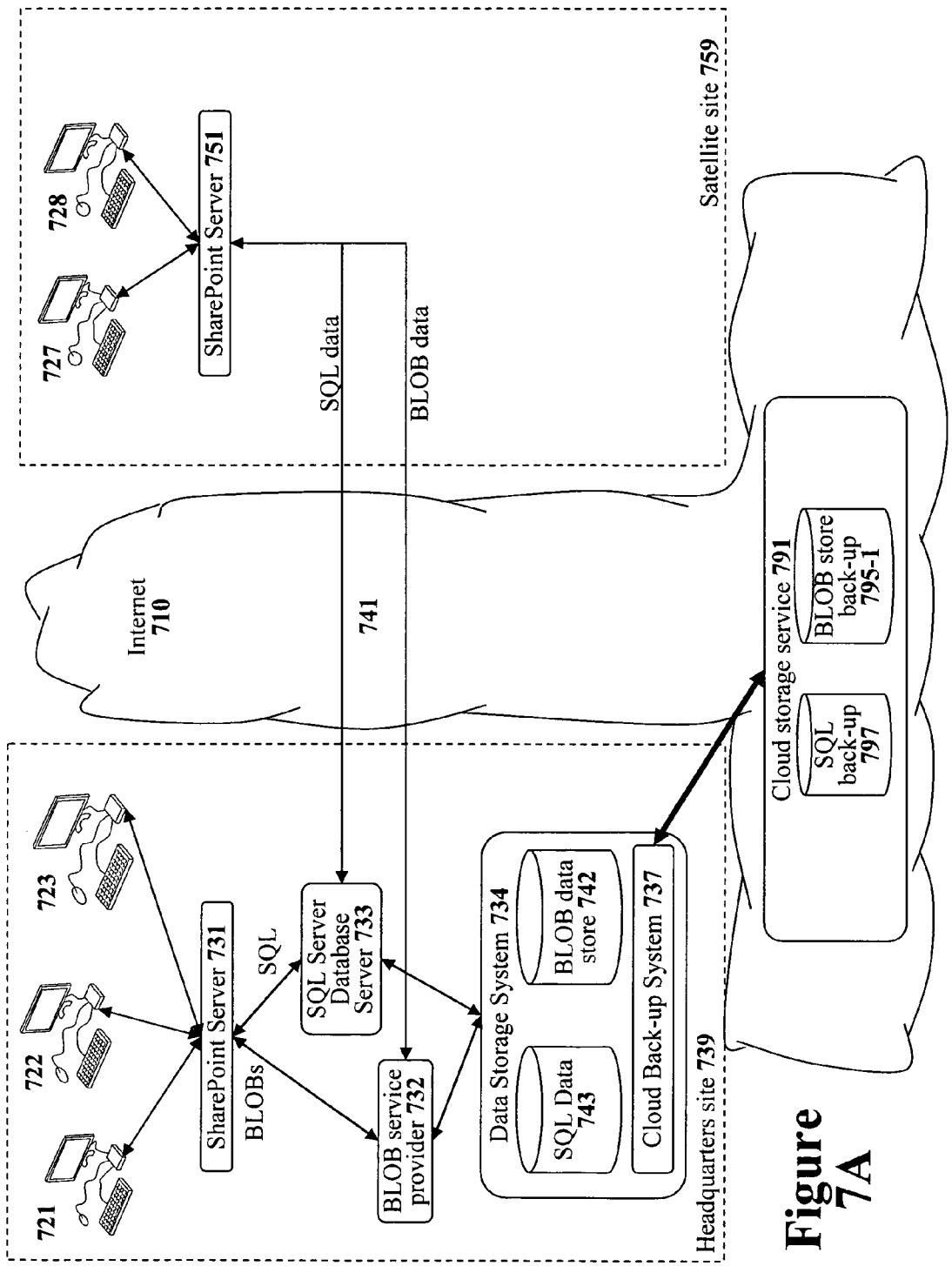
FIG. 7A illustrates a server arrangement that may be used to allow users at both a headquarters site and a satellite site to access a shared data repository located at the headquarters site.

FIG. 7A illustrates a first arrangement that may be used to allow users at a both a headquarters site 739 and a satellite site 759 to access data at a headquarters site 739 that has a main data repository. In the arrangement of FIG. 7A, the users are accessing data associated with a Microsoft SharePoint server 731, however other types of data and server systems would operate in a similar manner. A set of user workstations 721, 722, and 723 at the headquarters site 739 access a local SharePoint server 731 that stores data using a SQL Server database server 733 and a BLOB service provider 732. The raw data for both the SQL Server database server 733 and the BLOB service provider 732 is stored on a data storage system 734 as SQL data 743 and BLOB data 742, respectively.

To access the same SharePoint data from the satellite site 759, the users at workstations 727 and 728 at satellite site 759 may access a local SharePoint server 751. The local SharePoint server 751 at the satellite site 759 then accesses the SQL Server database server 733 and BLOB service provider 732 at the headquarters site 739 across a communication channel 741 to obtain the needed SharePoint data. In the embodiment of FIG. 7A the communication channel 741 is implemented using the Internet 710 but any type of suitable communication line (such as a private communication line) may be used instead.

With the arrangement of FIG. 7A, the users at workstations 727 and 728 at the satellite site 759 have a good direct connection to local SharePoint Server 751. However, since all of the underlying data for SharePoint Server 751 is located at the headquarters site 739, the performance of the arrangement of FIG. 7A will be less than desirable for the users at the satellite site 759. Specifically, the performance will only be as good as the communication channel 741. And even with a high-quality communication channel, a geographically remote site will have to deal with propagation delay along the communication channel 741. With a satellite office located on the other side planet, the remote office may experience delays of 600 milliseconds or more. In addition to the propagation delay, there may be a significant cost to transmitting large amounts of data to the other side of the planet. To significantly improve the performance of the system for the users located at the satellite site 759, the SharePoint server 751 at the satellite site 759 needs to be able to access to local SharePoint data.

Figure 7B:
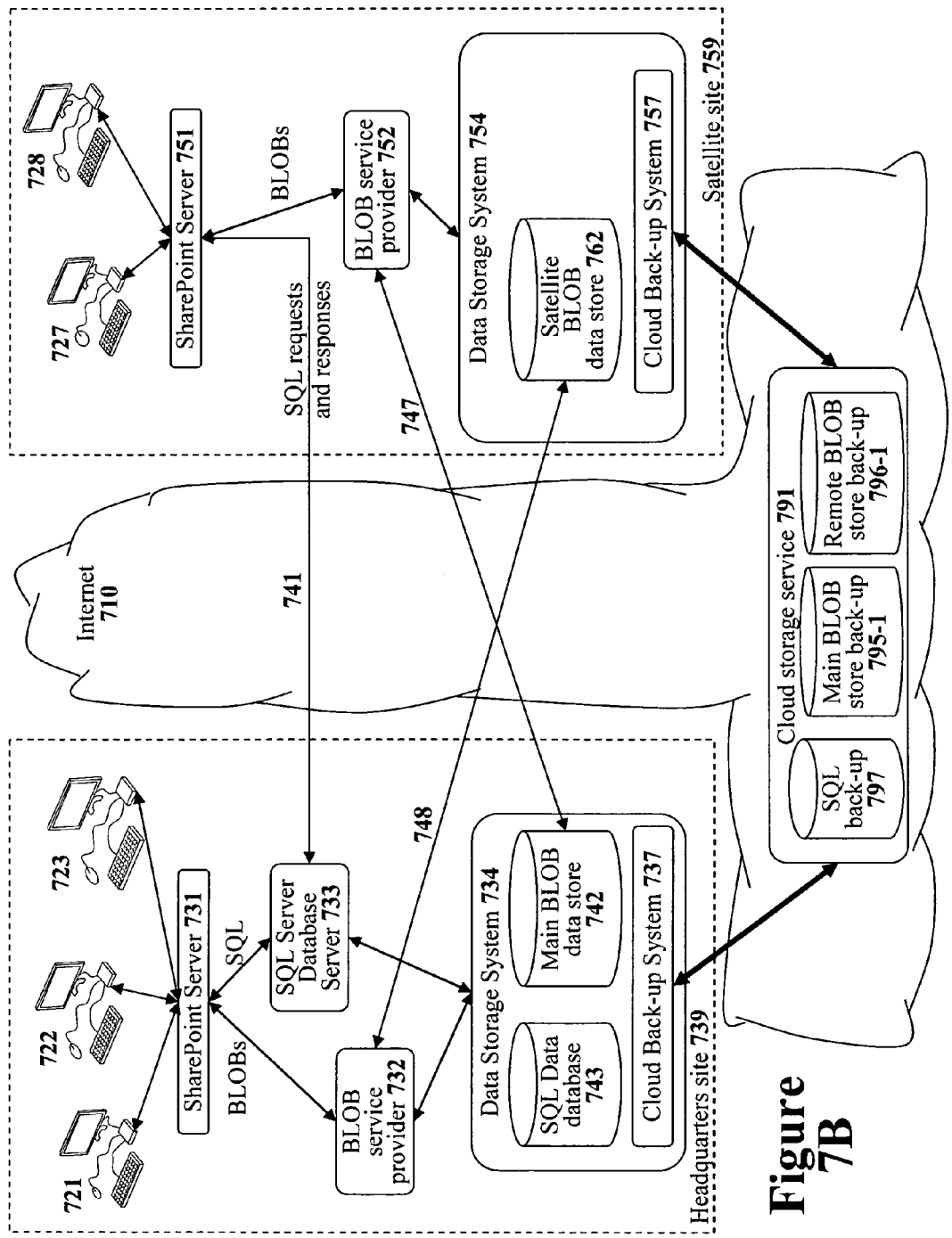
FIG. 7B illustrates a server arrangement that allows users at a satellite site to access a main database located at a headquarters site and a local bulk object data store located at the satellite site that is built by replicating information from a bulk object data store located at a headquarters site.

FIG. 7B illustrates an improved arrangement for implementing a remote satellite site 759 that has access to a remote SharePoint system. In the embodiment of FIG. 7B, the SharePoint server 751 at satellite site 759 continues to access a SQL Server database server 733 at the headquarters site 739 for SQL data requests and responses. However, the satellite SharePoint server 751 accesses a local BLOB service provider 752 at the satellite site 759 for all requests of BLOB data. The local BLOB service provider 752 obtains BLOB data from a local satellite BLOB data store 762 whenever possible. When requested BLOB data is not available locally, then the local BLOB service provider 752 will access requested BLOB data from the main BLOB data store 742 at the headquarters site 739. When the local BLOB service provider 752 is accessing local BLOB data stored in local BLOB data store 762, then the latency will be low.

In the environment of FIG. 7B, the satellite BLOB data store 762 will generally not be an identical copy of the main BLOB data store 742. Instead, the satellite BLOB data store 762 may only contain BLOB data items that were previously accessed by a user at the satellite site 759 or were created by a user at the satellite site 759. When a user at the satellite site 759 attempts to access a BLOB data item that is not available in the satellite BLOB data store 762 then the satellite BLOB service provider 752 will access the main BLOB data store 742 at the headquarters site 739 using communication path 747 to retrieve the missing BLOB data item. (Note that Communication line 747 may be implemented using the interne 710 as illustrated in FIG. 7B or with a different communication line.) The BLOB data item retrieved from the main BLOB data store 742 at the headquarters site 739 will then be provided to the user that requested the BLOB data item. The satellite BLOB service provider 752 will also store the retrieved BLOB data item into the local satellite BLOB data store 762. This creation of a local copy when first accessing a BLOB data item that is not available locally is known as a 'copy on first read' strategy. By storing a copy of the retrieved BLOB data item into the satellite BLOB data store 762 after it is first retrieved, that particular BLOB data item can then be accessed locally for all subsequent requests of that specific BLOB data item.

When a user at the at the satellite site 759 creates a new BLOB data item, then the satellite BLOB service provider 752 will only create a local version of that BLOB data item in the satellite BLOB data store 762. However, information about that new BLOB data item will be transmitted to the headquarters site 739 in the form of a BLOB identifier presented to the SQL Server Database Server 733. Thus, the SharePoint Server 731 will know about the new BLOB data item but will not have a local copy.

The BLOB service provider 732 in the headquarters site 739 may be implemented in the same manner with the same 'copy on first read' strategy. Thus, when a user at the headquarters site 739 attempts to access a BLOB data item, the BLOB service provider 732 will first attempt to access that BLOB data item from the main BLOB data store 742 at the headquarters site 739. When that data item is not available in the main BLOB data store 742 at the headquarters site 739, then the BLOB service provider 732 will access the satellite BLOB data store 762 at the satellite site 759 using communication line 748 to retrieve the requested BLOB data item. The BLOB service provider 732 will provide the BLOB data item to the user that made the request and also store that BLOB data item in the main BLOB data store 742 for all subsequent requests of that same BLOB data item by users at the headquarters site 739. Thus, a copy on first read occurs when first accessing a BLOB data item that is not available in the main The arrangement of FIG. 7B can be implemented easily for a SharePoint server system because SharePoint never changes existing BLOB data items. Instead, anytime that a change is made to a BLOB data item handled by a BLOB service provider, the SharePoint server will create a new file for the changed BLOB data item. Thus, with a SharePoint server system, there are no difficult cache coherency issues that can occur with the two BLOB data stores 742 and 762. Thus, there is no need to implement semaphores or any file-locking systems to prevent two users from accessing the same file concurrently.

The server arrangement of FIG. 7B may provide significant tangible resource savings. Specifically, the server arrangement of FIG. 7B will minimize the use of network bandwidth and storage capacity by sharing only the BLOB data items that both the headquarters office and the satellite office use. If there are BLOB data items at the headquarters site 739 that only pertain to the headquarters site 739 (such as documents related to the headquarters building maps, the local softball team, parking arrangement at the headquarters, etc.) and are never accessed by users at the satellite site 759 then those BLOB data items will never be transmitted to nor stored at the satellite site 759. Similarly, if there are BLOB data items at the satellite site 759 that only pertain to the satellite site 759 and are never accessed by users at the headquarters site 739 then those BLOB data items will never be transmitted to nor stored at the headquarters site 739. Both sites may therefore need back-up systems in order to protect all of the organization's data. However, the two sites may share a single account at a cloud storage service 791 to perform these back-ups.

The amount of data that transmitted between the headquarters site 739 and the satellite site 759 is greatly in the system of FIG. 7B when compared to the system of FIG. 7A. Although SQL requests and responses still travel between the SharePoint server 751 at satellite site 759 and the SQL Server database server 733 at the headquarters site 739, this represents a small volume of data traffic. In a typical SharePoint deployment, 85% to 95% of the data served by a SharePoint server tends to be the BLOB data. Thus, in the embodiment of FIG. 7B, 85% to 95% provided to users 727 and 728 may be served locally from the satellite BLOB data store 762 in local data storage system 754. Thus, the arrangement of FIG. 7B reduces costs by greatly reducing the amount of data traffic between the headquarters site 739 and the satellite site 759.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of reliably providing computer services, said method comprising:
    providing services from a first server system at a primary site, said server system configured to store data;
    splitting the data, by the first server system, into a first subset of data and a second subset of data, wherein the first subset of data and the second subset of data are separate data sets, wherein the first subset of data excludes bulk data and the second subset of data excludes light data, and wherein the light data includes data items that change more frequently than the bulk data;

transmitting changes to said first subset of data to a fail-over secondary site, said fail-over secondary site maintaining an active copy of said first subset of data and excluding the second subset of data;

backing-up said second subset of data by storing a back-up copy of said second subset of data at a network based storage service and excluding the first subset of data from the back-up copy, wherein the network based storage service is separate from the first server system and the fail-over secondary site; and activating said fail-over secondary site by accessing said back-up copy of said second subset of data stored on the network based storage service from said secondary site such that a second server at said fail-over secondary site has access to said active copy of said first subset of data from the primary site and said back-up copy of said second subset of data from the network based storage service.

2. The method of reliably providing computer services as set forth in claim 1, wherein transmitting changes to said first subset of data to a fail-over secondary site comprises database mirroring.

3. The method of reliably providing computer services as set forth in claim 1, wherein transmitting changes to said first subset of data to a fail-over secondary site comprises log shipping.

4. The method of reliably providing computer services as set forth in claim 1, wherein said first subset of data comprises a relational database.

5. The method of reliably providing computer services as set forth in claim 1, wherein said second subset of data comprises a set of large data objects.

6. The method of reliably providing computer services as set forth in claim 1, wherein backing-up said second subset of data comprises identifying and eliminating duplicate data in second subset of data.

7. The method of reliably providing computer services as set forth in claim 1, wherein backing-up said second subset of data comprises creating incremental back-ups relative to earlier back-ups.

8. The method of reliably providing computer services as set forth in claim 1, wherein accessing said back-up copy of said second subset of data from said secondary site comprises creating a new data volume that references said back-up copy of said second subset of data stored on said network based storage service.

9. The method of reliably providing computer services as set forth in claim 1, wherein accessing said back-up copy of said second subset of data from said secondary site comprises creating a restored copy at said secondary site of said back-up copy of said second subset of data stored at network based storage service.

10. The method of reliably providing computer services as set forth in claim 1, said method further comprising:

accessing said second subset of data at said primary site from said second server system when said first server system has failed such that said second server system may operate with access to said active copy of said first subset of data and said second subset of data at said primary site.

11. A reliable data service system, said reliable data service system comprising:

a first server disposed at a first site, said first server configured to split data into a first subset of data and a second subset of data, wherein the first subset of data and the second subset of data are separate data sets, wherein the first subset of data excludes bulk data and the second subset of data excludes light data, and wherein the light data includes data items that change more frequently than the bulk data;

a back-up server disposed in a back-up site remotely located with respect to the first site, the back-up server configured to store a back-up copy of said second subset of data and not the first subset of data; and a second server disposed at a second site remotely located with respect to the first site and the back-up site, said second server configured to store a copy of said first subset of data and not the second subset of data, said second server configured to serve both the first subset of data and the second subset of data in response to failure of the first server.

12. The reliable data service system as set forth in claim 11, wherein said copy of said first subset of data is created by transmitting changes to said first subset of data over to said second server site using database mirroring.

13. The reliable data service system as set forth in claim 11, wherein said copy of said first subset of data is created by transmitting changes to said first subset of data over to said second server site using log shipping.

14. The reliable data service system as set forth in claim 11, wherein said first subset of data comprises a relational database.

15. The reliable data service system as set forth in claim 11, wherein said second subset of data comprises a set of large data objects.

16. The reliable data service system as set forth in claim 11, wherein said back-up system identifies and eliminates duplicate data in said second subset of data when creating a back-up.

17. The reliable data service system as set forth in claim 11, wherein said back-up system creates incremental back-ups relative to earlier back-ups.

18. The reliable data service system as set forth in claim 11, wherein accessing said back-up copy of said second subset of data from said network-accessible back-up location comprises creating a new data volume that references said back-up copy of said second subset of data stored at said network-accessible back-up location.

19. The reliable data service system as set forth in claim 11, wherein accessing said back-up copy of said second subset of data from said network-accessible back-up location comprises creating a restored copy at said second server site of said back-up copy of said second subset of data stored at network-accessible back-up location.

20. The reliable data service system as set forth in claim 11, wherein said reliable data service system further comprises:

a data provider at said second server site, said data provider directly accessing said second subset of data at said first server site when said first server system has failed such that said second server system may operate with access to said copy of said first subset of data and said second subset of data.

* * * * *